Patented May 17, 1932

1,858,551

UNITED STATES PATENT OFFICE

ANTOINE ADOLPHE KAUFMANN, OF GENEVA, SWITZERLAND

MANUFACTURE OF GLYCIDIC ACIDS

No Drawing. Application filed October 21, 1929, Serial No. 401,387, and in Germany October 29, 1928.

For the manufacture of glycidic acids, the following two methods have been generally used up to now:

1. Action of alkali on chloro- or bromo-lactic acids which in their turn are obtained by causing hypochlorous or hypobromous acid to act on unsaturated acids.
2. Condensation of aldehydes with chloro-acetic ethers by means of alkaline agents such as sodium ethylate or sodamide. In this way glycidic acids are obtained in the form of their ethers.

The two processes do not give at all satisfactory yields. I have discovered now that glycidic acids can be very easily manufactured with an excellent yield by oxidation of α. β. unsaturated aldehydes in alkaline solution.

It is known that unsaturated aldehydes are easily oxidizable, for instance by the oxygen of the air. However, this oxidation leads generally to an entirely different series of products, namely unsaturated acids, di-hydroxy derivates, ketones, and lower saturated acids the least energetic oxidizing agents attacking the aldehyde group as well as the double bond, with breaking of the unsaturated chain.

As an oxidizing agent it is preferable to employ a solution of a hypo-halite, or else hydrogen peroxide. For instance with sodium hypo-bromite, the reaction takes place in accordance with the following equation:

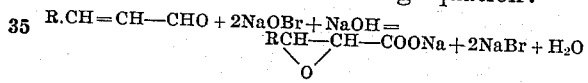

Thus an atom of oxygen is attached to the two unsaturated groups, and there is a simultaneous oxidation of the aldehyde group to an acid group. The reaction may take place either in an aqueous solution or in the presence of other solvents. The reaction is especially sharp with the hypo-halites whilst with hydrogen peroxide there is still a formation of secondary products such as cinnamic acid or even benzaldehyde.

As unsaturated aldehydes are at present more easily obtainable than the corresponding acids, the new process for the manufacture of glycidic acids constitutes at the same time an appreciable technical progress.

Example 1

330 parts of cinnamic aldehyde are dissolved in the same quantity of alchol and then mixed with 500 parts of 30% hydrogen peroxide. There will be a slight generation of heat, which becomes however considerable if alkali is added at the same time, in which case it becomes necessary to cool in order to avoid exceeding a temperature of 50 degrees centigrade. The solution rapidly becomes discolored, and sodium phenylglycidate is precipitated in the form of glittering crystals which can be dried by centrifuging and washed in alcohol and which are then perfectly pure.

The mother-waters contain still a certain amount of sodium phenylglycidate and secondary products of the reaction namely benzaldehyde, cinnamic acid and its ethylic ether, oxalic and phenylglyceric acids, etc.

Example 2

To a solution of hypo-bromite prepared with 100 liters of water, 12 kg. of caustic soda and 16 kg. of bromine, are gradually added with strong stirring 6.6 kg. of cinnamic aldehyde. The reaction takes place at once with an energetic generation of heat and after a short time crystals of sodium phenylglycidate begin to settle. The temperature should preferably not exceed 50 degrees centigrade. By cooling it is possible to isolate at least 7.5 kg. of the sodium salt free from halogenated organic by-products. The solution may also be used direct for the manufacture of phenylacetic aldehyde by known methods.

Example 3

To an oxidizing solution prepared as in the Example 2, are added 3.5 kg. of crotonic aldehyde. The oxidation takes place at once with generation of heat, and a clear solution of slightly yellowish colour is formed. By neutralization with a mineral acid, and by extraction with ether, it is possible to separate methyl glycidic acid which melts at 84 degrees centigrade and has all the properties described by Melikoff in the "Berichte der deutschen chemischen Gesellschaft 16. 1270."

What I claim is:

1. A process for the manufacture of glycidic acids, consisting in the oxidation of $\alpha.\beta.$ unsaturated aldehydes in an alkaline medium with hypo-halites.

2. A process for the manufacture of glycidic acids, consisting in the oxidation of $\alpha.\beta.$ unsaturated aldehydes in an alkaline medium with sodium hypobromite.

3. A process for the manufacture of glycidic acids, consisting in the oxidation of cinnamic aldehyde in an alkaline medium with sodium hypobromite for the purpose of obtaining phenyl-glycidic acid.

4. A process for the manufacture of glycidic acids, consisting in the oxidation of crotonic aldehyde in an alkaline medium with sodium hypobromite for the purpose of obtaining methyl-glycidic acid.

In testimony whereof I affix my signature.

ANTOINE ADOLPHE KAUFMANN.